US011180603B2

(12) United States Patent
Thomas et al.

(10) Patent No.: US 11,180,603 B2
(45) Date of Patent: Nov. 23, 2021

(54) POLYOXAZOLIDONES AND PRODUCTION THEREOF

(71) Applicant: BASF SE, Ludwigshafen am Rhein (DE)

(72) Inventors: Hans-Josef Thomas, Ludwigshafen (DE); Markus Schuette, Lemfoerde (DE); Berend Eling, Lemfoerde (DE); Patrick Matt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 181 days.

(21) Appl. No.: 16/475,740

(22) PCT Filed: Feb. 14, 2018

(86) PCT No.: PCT/EP2018/053612
§ 371 (c)(1),
(2) Date: Aug. 14, 2019

(87) PCT Pub. No.: WO2018/149844
PCT Pub. Date: Aug. 23, 2018

(65) Prior Publication Data
US 2019/0359757 A1 Nov. 28, 2019

(30) Foreign Application Priority Data

Feb. 16, 2017 (EP) .................................. 17000254
Sep. 8, 2017 (EP) .................................. 17190143
Dec. 19, 2017 (EP) .................................. 17208317

(51) Int. Cl.
*C08G 18/20* (2006.01)
*C08G 18/00* (2006.01)
*C08G 18/16* (2006.01)
*C08G 18/76* (2006.01)
*C08G 18/58* (2006.01)

(52) U.S. Cl.
CPC ....... *C08G 18/2045* (2013.01); *C08G 18/003* (2013.01); *C08G 18/168* (2013.01); *C08G 18/58* (2013.01); *C08G 18/581* (2013.01); *C08G 18/7621* (2013.01)

(58) Field of Classification Search
CPC .. C08G 18/58; C08G 18/581; C08G 18/2045; C08G 18/168
See application file for complete search history.

(56) References Cited

U.S. PATENT DOCUMENTS

| 3,020,262 | A | 2/1962 | Speranza |
| 4,564,651 | A | 1/1986 | Markert et al. |
| 4,658,007 | A | 4/1987 | Marks et al. |
| 2014/0121299 | A1 | 5/2014 | Feng et al. |
| 2015/0291726 | A1 | 10/2015 | Mueller et al. |
| 2017/0088659 | A1 | 3/2017 | Müller et al. |
| 2017/0283543 | A1 * | 10/2017 | Holtgrewe ......... C08G 18/2027 |

FOREIGN PATENT DOCUMENTS

| DE | 102 02 838 A1 | 8/2003 | |
| DE | 10 2014 226 838 A1 | 6/2016 | |
| WO | WO 2014/076024 A1 | 5/2014 | |
| WO | WO 2015/173110 A1 | 11/2015 | |
| WO | WO 2015/173111 A1 | 11/2015 | |
| WO | WO-2016102358 A1 * | 6/2016 | ......... C08G 18/2027 |

OTHER PUBLICATIONS

International Search Report dated May 9, 2018 in PCT/EP2018/053612 (with English translation), 7 pages.
International Preliminary Report on Patentability dated Jan. 23, 2019 in PCT/EP2018/053612 filed Feb. 14, 2018, (with English translation), 5 pages.
Peter Wasserscheid, et al., "Ionische Flüssigkeiten—Neue "Lösungen" Für Die Übergangsmetallkatalyse" Angewandte Chemie, vol. 112, 2000, pp. 3926-3945.
International Preliminary Report on Patentability dated Aug. 22, 2019 in PCT/EP2018/053612.
U.S. Appl. No. 15/557,671, filed Sep. 12, 2017, US 2018/0051171 A1, Frank Prissok, et al.
U.S. Appl. No. 15/556,875, filed Sep. 8, 2017, US 2018/0237657 A1, Andre Kamm, et al.
U.S. Appl. No. 15/555,097, filed Sep. 1, 2017, US 2018/0037693 A1, Berend Eling, et al.
U.S. Appl. No. 15/574,511, filed Nov. 16, 2017, US 2018/0126338 A1, Martin Weber, et al.
U.S. Appl. No. 16/086,667, filed Sep. 20, 2018, US 2019/0071535 A1, Elmar Poeselt, et al.
U.S. Appl. No. 16/097,491, filed Oct. 29, 2018, US 2019/0144338 A1, Bernd Bruchmann, et al.
U.S. Appl. No. 16/098,552, filed Nov. 2, 2018, US 2019/0119541 A1, Bernd Bruchmann, et al.

* cited by examiner

*Primary Examiner* — Michael L Leonard
(74) *Attorney, Agent, or Firm* — Grüneberg and Myers PLLC

(57) ABSTRACT

The present patent application relates to a thermoplastic polymer produced at least from diisocyanate and diepoxide using a catalyst, wherein the catalyst is an ionic liquid, to an associated production method and use.

16 Claims, No Drawings

POLYOXAZOLIDONES AND PRODUCTION THEREOF

The present invention relates to a thermoplastic polymer based on diisocyanate and diepoxide, which is also referred to as a polyoxazolidone.

The production of polyoxazolidones based on diisocyanate and diepoxide is known in principle. In this case, most of the focus has been directed at crosslinked structures, as are mentioned, for example, in DE 10 2014 226 838 A1. Starting from the isocyanate and epoxide, a series of side reactions occur here which have disadvantageous effects on the thermoplastic properties of the polyoxazolidones.

The synthesis of linear polyoxazolidones is described in documents WO 2015/173111 A1, WO 2015/173 110 A1, US 2014/012 299, DE 10 2014 226 838 A1 and WO 2014/076024 A1. The catalysts described here, however, do not involve the use of ionic liquids as catalyst.

The object of the present invention was therefore that of providing thermoplastic polyoxazolidones in the case of which side reactions occur only to a small degree in order not to disadvantageously influence the properties, especially also the thermoplastic property, of the polyoxazolidone.

Surprisingly, it was possible to considerably improve the product properties, especially also the thermoplastic property, of polyoxazolidones by producing the polyoxazolidone with a suitable catalyst that can also be present in the end product.

The present invention thus relates to a polymer produced at least from diisocyanate and diepoxide using a catalyst, wherein the catalyst is an ionic liquid.

The invention additionally relates to the production of this polymer and the use thereof.

DETAILED DESCRIPTION

Diepoxides

The diepoxides are epoxides having preferably exactly two epoxide groups per molecule. These epoxides can be either saturated or unsaturated, aliphatic, cycloaliphatic, aromatic or heterocyclic. They can further comprise those substituents which under the reaction conditions do not cause any interfering side reactions, for example alkyl or aryl substituents, ether groups and the like.

The diepoxides are preferably polyglycidyl ethers based on dihydric alcohols, phenols, hydrogenation products of these phenols and/or on novolaks. Novolaks are reaction products of phenols with aldehydes, especially formaldehyde, in the presence of acidic catalysts, particular preference being given here to the diglycidyl ethers. Diepoxides based on other structures which do not contain any ether groups are also possible, however.

Other preferred diepoxides are based on diglycidyl ethers of natural raw materials, preferably cardanol. A typical example of such a product is Cardolite NC 514 (from Cardolite). The advantage of this epoxide is the relatively long alkyl chain between the aromatic systems, which leads to a greater degree of flexibility of the polymers produced therefrom. The advantages of aliphatic structural elements are particularly effective in combination with aromatic diglycidyl ethers. Therefore, diepoxides based on aliphatic diglycidyl ethers in combination with aromatic diglycidyl ethers are particularly preferred.

The epoxide equivalent weights (EEW) of these epoxide compounds are preferably between 100 and 5000, especially between 150 and 500. The epoxide equivalent weight of a substance is defined here as that amount of the substance (in grams) which comprises 1 mol of oxirane rings. The determination method is described in the examples.

The following compounds are preferably considered as polyhydric phenols: resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3-dimethyldiphenylpropane, 4,4'-dihydroxydiphenyl, 4,4'-dihydroxybenzophenol, bis(4-hydroxyphenyl)-1,1-ethane, bis(4-hydroxyphenyl)-1,1-isobutane, bis(4-hydroxyphenyl)methane, bis(4-hydroxyphenyl) ether, bis(4-hydroxyphenyl) sulfone, inter alia, and also the chlorination and bromination products of the abovementioned compounds; bisphenol A is very particularly preferred here. Examples of commercial products for bisphenol A diglycidyl ethers are DER 331, DER 330 from DOW U.S.A. or Epilox A18-00 from Leuna Harze, Germany.

Isocyanates

In the present case, "diisocyanate" is understood to be either a single substance or a mixture of substances, preferably selected from the following list. The diisocyanates are preferably organic isocyanates, and more preferably aliphatic, cycloaliphatic, araliphatic and/or aromatic isocyanates, which are further preferably selected from the group of tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate. IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethyldiphenyl 3,3'-diisocyanate, diphenylethane 1,2-diisocyanate, dicyclohexylmethane 4,4'-, 2,4'- and 2,2'-diisocyanate (H12 MDI), paraphenylene 2,4-diisocyanate (PPDI), tetramethylenexylene 2,4-diisocyanate (TMXDI), preferably diphenylmethane 2,2'-, 2,4'- and/or 4,4'-diisocyanate (MDI) and/or hexamethylene 1,6-diisocyanate (HDI). Aromatic diisocyanates selected from the above list are preferred. The isocyanate is further preferably selected from the group of tolylene diisocyanate (TDI), diphenylmethane diisocyanate (MDI) and naphthylene 1,5-diisocyanate (NDI). Tolylene diisocyanate (TDI) or diphenylmethane diisocyanate (MDI) is very particularly preferred.

Catalyst

The catalysts employed for the production of the thermoplastic polymer are ionic liquids. Ionic liquids are organic salts, the ions of which prevent the formation of a stable crystal lattice as a result of charge delocalization and steric effects. Just a small amount of thermal energy is therefore sufficient to overcome the lattice energy and break up the solid crystal structure. They are thus salts that are liquid at temperatures below 250° C., preferably below 200° C. and particularly preferably below 150° C., without the salt being dissolved here in a solvent such as water or the like.

The cations of the ionic liquid are preferably alkylated and are further preferably selected from the following group: imidazolium, pyridinium, pyrrolidinium, guanidinium, uronium, thiouronium, piperidinium, morpholinium, ammonium and phosphonium. The anions in the ionic liquid are preferably halides or complex ions preferably selected from the group of: tetrafluoroborate, trifluoroacetate, triflate, hexafluorophosphate, phosphinate and tosylate. In another preferred embodiment, the anions are organic ions, preferably imides or amides.

Within the meaning of the present invention, ionic liquids are preferably salts of the general formula (A) salts of the general formula (I)

$$[A]_n^+[Y]^{n-} \quad (I),$$

in which n is 1, 2, 3 or 4, $[A]^+$ is a quaternary ammonium cation, an oxonium cation, a sulfonium cation or a phosphonium cation and $[Y]$ is a monovalent, divalent, trivalent or tetravalent anion; or (B) mixed salts of the general formulae (II)

$$[A^1]^+[A^2]^+[Y]^{n-} \quad (IIa),$$

where $n=2$;

$$[A^1]^+[A^2]^+[A^3]^+[Y]^{n-} \quad (IIb),$$

where $n=3$; or $$[A^1]^+[A^2]^+[A^3]^+[A^4]^+[Y]^{n-} \quad (IIc),$$

where $n=4$ and where $[A^1]^+$, $[A^2]^+$, $[A^3]^+$ and $[A^4]^+$ are each independently selected from the groups stated for $[A]^+$ and $[Y]^{n-}$ has the meaning stated under (A); or (C) mixed salts of the general formulae (III)

$$[A^1]^+[A^2]^+[A^3]^+[M^1]^+[Y]^{n-} \quad (IIIa),$$

where $n=4$;

$$[A^1]^+[A^2]^+[M^1]^+[M^2]^+[Y]^{n-} \quad (IIIb),$$

where $n=4$;

$$[A^1]^+[M^1]^+[M^2]^+[M^3]^+[Y]^{n-} \quad (IIIc),$$

where $n=4$;

$$[A^1]^+[A^2]^+[M^1]^+[Y]^{n-} \quad (IId),$$

where $n=3$;

$$[A^1]^+[M^1]^+[M^2]^+[Y]^{n-} \quad (IIIe),$$

where $n=3$;

$$[A^1]^+[M^1]^+[Y]^{n-} \quad (IIIf),$$

where $n=2$;

$$[A^1]^+[A^2]^+[M^4]^{2+}[Y]^{n-} \quad (IIIg),$$

where $n=4$;

$$[A^1]^+[M^1]^+[M^4]^{2+}[Y]^{n-} \quad (IIIh),$$

where $n=4$;

$$[A^1]^+[M^5]^{3+}[Y]^{n-} \quad (IIIi),$$

where $n=4$; or $$[A^1]^+[M^4]^{2+}[Y]^{n-} \quad (IIIj),$$

where $n=3$ and where $[A^1]^+$, $[A^2]^+$ and $[A^3]^+$ are each independently selected from the groups stated for $[A]^+$, $[Y]^{n-}$ has the meaning stated under (A) and $[M^1]^+$, $[M^1]^+$, $[M^2]^+$, $[M^3]^+$ are monovalent metal cations, $[M^4]^{2+}$ are divalent metal cations and $[M^5]^{3+}$ are trivalent metal cations.

Compounds suitable for forming the cation $[A]^+$ of ionic liquids are known for example from DE 102 02 838 A1. For instance, such compounds may comprise oxygen, phosphorus, sulfur or especially nitrogen atoms, for example at least one nitrogen atom, preferably 1-10 nitrogen atoms, particularly preferably 1-5, very particularly preferably 1-3 and especially 1-2 nitrogen atoms. Further heteroatoms such as oxygen, sulfur or phosphorus atoms can also optionally also be present. The nitrogen atom is a suitable carrier of the positive charge in the cation of the ionic liquid, from which, at equilibrium, a proton or an alkyl radical can then migrate to the anion to produce an electrically neutral molecule.

If the nitrogen atom is the carrier of the positive charge in the cation of the ionic liquid, a cation can firstly be produced in the synthesis of the ionic liquids by quaternization on the nitrogen atom of, for instance, an amine or nitrogen heterocycle. Quaternization can be effected by alkylation of the nitrogen atom. Depending on the alkylating reagent used, salts having different anions are obtained. In cases in which it is not possible to form the desired anion directly in the quaternization, this can be carried out in a further synthesis step. Starting from, for example, an ammonium halide, the halide can be reacted with a Lewis acid to form a complex anion from halide and Lewis acid. As an alternative, exchange of a halide ion for the desired anion is possible. This can be effected by addition of a metal salt with precipitation of the metal halide formed, by means of an ion exchanger or by displacement of the halide ion by a strong acid (with liberation of the hydrohalic acid). Suitable processes are described for example in Angew. Chem. 2000, 112, pp 3926-3945 and the literature cited therein.

Suitable alkyl radicals with which the nitrogen atom in the amines or nitrogen heterocycles can be quaternized, by way of example, are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or have one or more identical or different substituents.

Preference is given to those compounds comprising at least one five- to six-membered heterocycle, especially a five-membered heterocycle, which has at least one nitrogen atom and optionally an oxygen or sulfur atom, particular preference being given to those compounds comprising at least one five- to six-membered heterocycle which has one, two or three nitrogen atoms and one sulfur or an oxygen atom, very particular preference being given to those having two nitrogen atoms. Further preference is given to aromatic heterocycles.

Particularly preferred compounds are those having a molar mass below 1000 g/mol, very particularly preferably below 500 g/mol.

Furthermore, preference is given to those cations selected from the compounds of the formulae (IVa) to (IVx3),

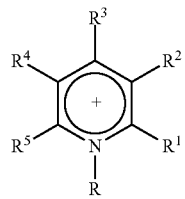

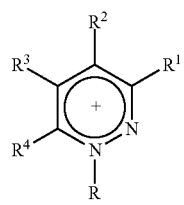
(IVb)
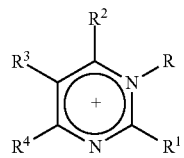
(IVc)
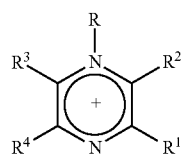
(IVd)
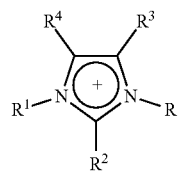
(IVe)
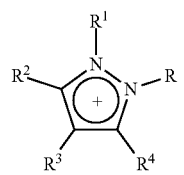
(IVf)
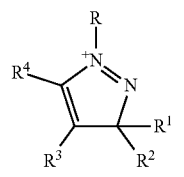
(IVg)
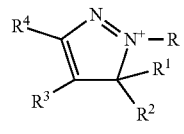
(IVg')
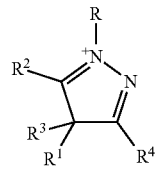
(IVh)
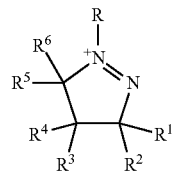
(IVi)
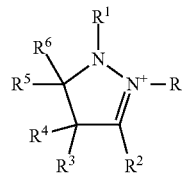
(IVj)
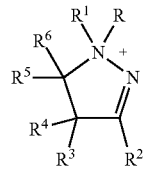
(IVj')
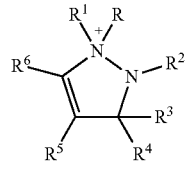
(IVk)
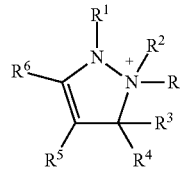
(IVk')
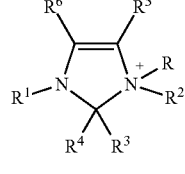
(IVl)
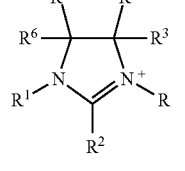
(IVm)
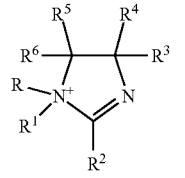
(IVm')
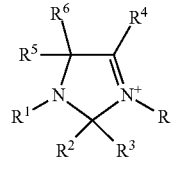
(IVn)
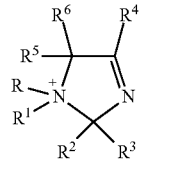
(IVn')

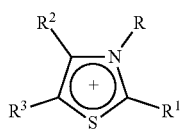
(IVo)
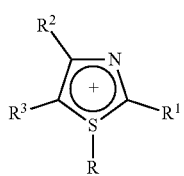
(IVo')
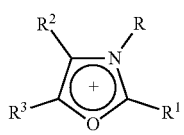
(IVp)
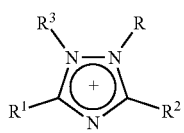
(IVq)
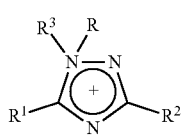
(IVq')
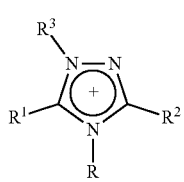
(IVq")
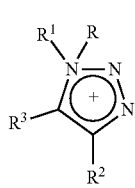
(IVr)
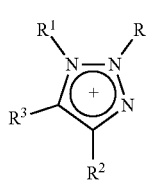
(IVr')
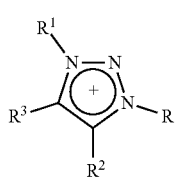
(IVr")
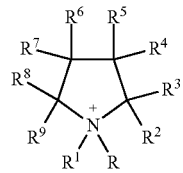
(IVs)
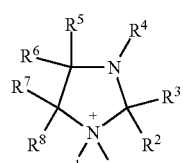
(IVt)
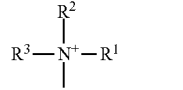
(IVu)
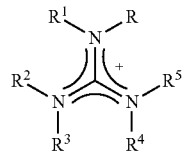
(IVv)
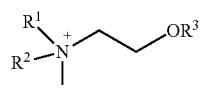
(IVw)
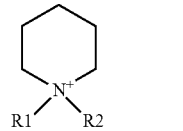
(IVx0)
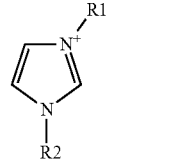
(IVx1)
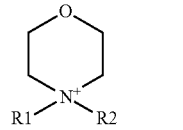
(IVx2)
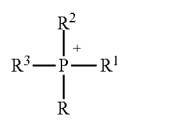
(IVx3)
and oligomers comprising these structures.
Further suitable cations are compounds of the general formulae (IVy) and (IVz)
(IVy)
$$R^3-\overset{R^2}{\underset{R}{P^+}}-R^1$$

-continued

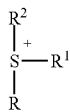
(IVz)

and oligomers comprising these structures.

In the abovementioned formulae (IVa) to (IVz)

the radical R is hydrogen, a carbon-comprising organic, saturated or unsaturated, acyclic or cyclic, aliphatic, aromatic or araliphatic radical which has 1 to 20 carbon atoms and is unsubstituted or interrupted or substituted by 1 to 5 heteroatoms or suitable functional groups; and the radicals $R^1$ to $R^9$ are each independently hydrogen, a sulfo group or a carbon-comprising organic, saturated or unsaturated, acyclic or cyclic, aliphatic, aromatic or araliphatic radical which has 1 to 20 carbon atoms and is unsubstituted or interrupted or substituted by 1 to 5 heteroatoms or suitable functional groups, where the radicals $R^1$ to $R^9$ which are bonded in the abovementioned formulae (IV) to a carbon atom (and not to a heteroatom) may additionally also be halogen or a functional group; or two adjacent radicals from among $R^1$ to $R^9$ together are also a divalent, carbon-comprising organic, saturated or unsaturated, acyclic or cyclic, aliphatic, aromatic or araliphatic radical which has 1 to 30 carbon atoms and is unsubstituted or interrupted or substituted by 1 to 5 heteroatoms or suitable functional groups.

Possible heteroatoms in the definition of the radicals R and $R^1$ to $R^9$ are in principle all heteroatoms capable in a formal sense of replacing a —$CH_2$—, a —CH=, a —C≡ or a =C= group. If the carbon-comprising radical comprises heteroatoms, preference is given to oxygen, nitrogen, sulfur, phosphorus and silicon. Preferred groups especially include —O—, —S—, —SO—, —$SO_2$—, —NR'—, —N=, —PR'—, —PR'$_2$ and —SiR'$_2$—, where the radicals R' are the remaining portion of the carbon-comprising radical. Here, the radicals $R^1$ to $R^9$ can also be bonded directly via the heteroatom in the cases in which, in the abovementioned formulae (IV), they are bonded to a carbon atom (and not to a heteroatom).

Possible functional groups are in principle all functional groups which can be bonded to a carbon atom or a heteroatom. Suitable examples are —$NR_2$' and —CN (cyano). Functional groups and heteroatoms may also be directly adjacent, and so combinations of a plurality of adjacent atoms, for instance —O— (ether), —S— (thioether), —COO— (ester) or —CONR'— (tertiary amide), are encompassed as well, for example di($C_1$-$C_4$-alkyl)amino, $C_1$-$C_4$-alkyloxycarbonyl or $C_1$-$C_4$-alkyloxy. The radicals R' are the remaining portion of the carbon-comprising radical.

Preferred halogens are fluorine, chlorine, bromine and iodine.

Preferably, the radical R is unbranched or branched $C_1$-$C_{18}$-alkyl which has 1 to 20 carbon atoms in total and is unsubstituted or mono- to polysubstituted by halogen, phenyl, cyano, such as for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, benzyl, 3-phenylpropyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl and undecylfluoroisopentyl;

glycols, butylene glycols and oligomers thereof having 1 to 100 units and a $C_1$-$C_6$-alkyl as end group, such as for example $R^AO$—(CHR$^B$—$CH_2$—O)—CHR$^B$—$CH_2$— or $R^AO$—($CH_2CH_2CH_2CH_2O$)—$CH_2CH_2CH_2CH_2$— where $R^A$ and $R^B$ are preferably methyl or ethyl and n is preferably 0 to 3, especially 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl;

1-propen-1-yl, 1-propen-2-yl and 1-propen-3-yl; and

N,N-di-$C_1$-$C_6$-alkylamino, such as for example N,N-dimethylamino and N,N-diethylamino.

The radical R is particularly preferably an unbranched and unsubstituted $C_1$-$C_{18}$-alkyl, such as for example methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, especially methyl, ethyl, 1-butyl and 1-octyl, and also $CH_3O$—($CH_2CH_2O$)$_n$—$CH_2CH_2$— and $CH_3CH_2O$—($CH_2CH_2O$)$_n$—$CH_2CH_2$— where n is 0 to 3.

Preferably, the radicals $R^1$ to $R^9$ are each independently hydrogen;

halogen;

a suitable functional group;

$C_1$-$C_{18}$-alkyl optionally substituted by suitable functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;

$C_2$-$C_{18}$-alkenyl optionally substituted by suitable functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;

$C_6$-$C_{12}$-aryl optionally substituted by suitable functional groups, aryl, alkyl, aryloxy, alkyloxy, halogen, heteroatoms and/or heterocycles;

$C_5$-$C_{12}$-cycloalkyl optionally substituted by suitable functional groups, aryl, alkyl, aryloxy, alkyloxy, halogen, heteroatoms and/or heterocycles;

$C_5$-$C_{12}$-cycloalkenyl optionally substituted by suitable functional groups, aryl, alkyl, aryloxy, alkyloxy, halogen, heteroatoms and/or heterocycles; or a five- to six-membered heterocycle which has oxygen, nitrogen and/or sulfur atoms and is optionally substituted by suitable functional groups, aryl, alkyl, aryloxy, alkyloxy, halogen, heteroatoms and/or heterocycles; or two adjacent radicals together with the atoms to which they are bonded are an unsaturated, saturated or aromatic ring which is optionally substituted by suitable functional groups, aryl, alkyl, aryloxy, alkyloxy, halogen, heteroatoms and/or heterocycles and is optionally interrupted by one or more oxygen and/or sulfur atoms and/or one or more substituted or unsubstituted imino groups.

$C_1$-$C_1$-alkyl optionally substituted by suitable functional groups, aryl, alkyl, aryloxy, alkyloxy, halogen, heteroatoms and/or heterocycles is preferably methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl, 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentylpropyl, cyclohexylmethyl, 2-cyclohexylethyl, 3-cyclohexylpropyl, benzyl (phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, methoxy, ethoxy, 1,3-dioxolan-2-yl, 1,3-dioxan-2-yl, 2-methyl-1,3-dioxolan-2-yl, 4-methyl-1,3-dioxolan-2-yl, 2-dimethylaminoethyl, 2-dimethylaminopropyl, 3-dimethylaminopropyl, 4-dimethylaminobutyl, 6-dimethylaminohexyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, $C_nF_{2(n-a)+(1-b)}H_{2a+b}$ where n is 1 to 30, 0≤a≤n and b=0 or 1 (for example $CF_3$, $C_2F_5$, $CH_2CH_2$—$C_{(n-2)}F_{2(n-2)+1}$, $C_6F_{13}$, $C_8F_{17}$, $C_{10}F_{21}$, $C_{12}F_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)methyl, 2-(ethoxycarbonyl)methyl, 2-(n-butoxycarbonyl)methyl, butylthiomethyl, 2-dodecylthioethyl, 2-phenylthioethyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

$C_2$-$C_1$-alkenyl optionally substituted by suitable functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_nF_{2(n-a)-(1-b)}H_{2a-b}$ where n≤30, 0≤a≤n and b=0 or 1.

$C_6$-$C_{12}$-aryl optionally substituted by suitable functional groups, aryl, alkyl, aryloxy, alkyloxy, halogen, heteroatoms and/or heterocycles is preferably phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthiophenyl, isopropylthiophenyl or tert-butylthiophenyl or $C_6F_{(5-a)}H_a$ where 0≤a≤5.

$C_5$-$C_{12}$-cycloalkyl optionally substituted by suitable functional groups, aryl, alkyl, aryloxy, alkyloxy, halogen, heteroatoms and/or heterocycles is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, $C_nF_{2(n-a)-(1-b)}H_{2a-b}$ where n≤30, 0≤a≤n and b=0 or 1 and also a saturated or unsaturated bicyclic system such as for example norbornyl or norbornenyl.

$C_5$-$C_{12}$-cycloalkenyl optionally substituted by suitable functional groups, aryl, alkyl, aryloxy, alkyloxy, halogen, heteroatoms and/or heterocycles is preferably 3-cyclopentenyl, 2-cyclohexenyl, 3-cyclohexenyl, 2,5-cyclohexadienyl or $C_nF_{2(n-a)-3(1-b)}H_{2a-3b}$ where n≤30, 0≤a≤n and b=0 or 1.

A five- to six-membered heterocycle which has oxygen, nitrogen and/or sulfur atoms and is optionally substituted by suitable functional groups, aryl, alkyl, aryloxy, alkyloxy, halogen, heteroatoms and/or heterocycles is preferably furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring which is optionally substituted by suitable functional groups, aryl, alkyl, aryloxy, alkyloxy, halogen, heteroatoms and/or heterocycles and is optionally interrupted by one or more oxygen and/or sulfur atoms and/or one or more substituted or unsubstituted imino groups, this is preferably 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not subject to any restrictions. Generally, it amounts to not more than 5 in the radical, preferably not more than 4 and very particularly preferably not more than 3.

If the abovementioned radicals comprise heteroatoms, there will generally be at least one carbon atom, preferably at least two carbon atoms, between two heteroatoms.

Particularly preferably, the radicals $R^1$ to $R^9$ are each independently
hydrogen;
unbranched or branched $C_1$-$C_{18}$-alkyl which has 1 to 20 carbon atoms in total and is unsubstituted or mono- to polysubstituted by halogen, phenyl, cyano, $C_1$-$C_5$-alkoxycarbonyl and/or such as for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, benzyl, 3-phenylpropyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl and undecylfluoroisopentyl;

glycols, butylene glycols and oligomers thereof having 1 to 100 units and a $C_1$- to $C_8$-alkyl as end group, such as for example $R^4O$—$(CHR^B$—$CH_2$—$O)_n$—$CHR^B$—$CH_2$— or $R^4O$—$(CH_2CH_2CH_2CH_2O)_n$—$CH_2CH_2CH_2CH_2O$— where $R^A$ and $R^B$ are preferably methyl or ethyl and n is preferably 0 to 3, especially 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl;

1-propen-1-yl, 1-propen-2-yl and 1-propen-3-yl; and

N,N-di-$C_1$-$C_6$-alkylamino, such as for example N,N-dimethylamino and N,N-diethylamino, where if IIIw is III, then $R^3$ is not hydrogen.

The radicals $R^1$ to $R^9$ are very particularly preferably each independently hydrogen or $C_1$-$C_{18}$-alkyl, such as for example methyl, ethyl, 1-butyl, 1-pentyl, 1-hexyl, 1-heptyl, 1-octyl, or are phenyl, 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine and also $CH_3O$—$(CH_2CH_2O)_n$—$CH_2CH_2$— and $CH_3CH_2O$—$(CH_2CH_2O)_n$—$CH_2CH_2$— where n is 0 to 3, where if IIIw is III, then $R^3$ is not hydrogen.

Pyridinium ions (IVa) used are very particularly preferably those in which one of the radicals $R^1$ to $R^5$ is methyl, ethyl or chlorine and the remaining radicals $R^1$ to $R^5$ are hydrogen;

$R^3$ is dimethylamino and the remaining radicals $R^1$, $R^2$, $R^4$ and $R^5$ are hydrogen;

all of the radicals $R^1$ to $R^5$ are hydrogen;

$R^1$ and $R^2$ or $R^2$ and $R^3$ is 1,4-buta-1,3-dienylene and the remaining radicals $R^1$, $R^2$, $R^4$ and $R^5$ are hydrogen;

and especially those in which $R^1$ to $R^5$ are hydrogen; or one of the radicals $R^1$ to $R^5$ is methyl or ethyl and the remaining radicals $R^1$ to $R^5$ are hydrogen.

Very particularly preferred pyridinium ions (IVa) include 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethylpyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Pyridazinium ions (IVb) used are very particularly preferably those in which $R^1$ to $R^4$ are hydrogen; or one of the radicals $R^1$ to $R^4$ is methyl or ethyl and the remaining radicals $R^1$ to $R^4$ are hydrogen.

Pyrimidinium ions (IVc) used are very particularly preferably those in which $R^1$ is hydrogen, methyl or ethyl and $R^2$ to $R^4$ are each independently hydrogen or methyl; or $R^1$ is hydrogen, methyl or ethyl, $R^2$ and $R^4$ are methyl and $R^3$ is hydrogen.

Pyrazinium ions (IVd) used are very particularly preferably those in which $R^1$ is hydrogen, methyl or ethyl and $R^2$ to $R^4$ are each independently hydrogen or methyl;

$R^1$ is hydrogen, methyl or ethyl, $R^2$ and $R^4$ are methyl and $R^3$ is hydrogen;

$R^1$ to $R^4$ are methyl; or $R^1$ to $R^4$ are hydrogen.

Imidazolium ions (IVe) used are very particularly preferably those in which $R^1$ is hydrogen, methyl, ethyl, 1-propyl, 1-butyl, 1-pentyl, 1-hexyl, 1-octyl or 2-cyanoethyl and $R^2$ to $R^4$ are each independently hydrogen, methyl or ethyl.

Very particularly preferred imidazolium ions (IVe) include 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium and 1-(prop-1-en-3-yl)-3-methylimidazolium.

The most-preferred 1,3-dialkylimidazolium ions are the 1-butyl-3-methylimidazolium ion and 1-ethyl-3-methylimidazolium ion.

Pyrazolium ions (IVf), (IVg) or (IVg) used are very particularly preferably those in which $R^1$ is hydrogen, methyl or ethyl and $R^2$ to $R^4$ are each independently hydrogen or methyl.

Pyrazolium ions (IVh) used are very particularly preferably those in which $R^1$ to $R^4$ are each independently hydrogen or methyl.

1-Pyrazolinium ions (IVi) used are very particularly preferably those in which
$R^1$ to $R^6$ are each independently hydrogen or methyl.

2-Pyrazolinium ions (IVj) or (IVj') used are very particularly preferably those in which
$R^1$ is hydrogen, methyl, ethyl or phenyl and $R^2$ to $R^6$ are each independently hydrogen or methyl.

3-Pyrazolinium ions (IVk) or (IVk') used are very particularly preferably those in which
$R^1$ and $R^2$ are each independently hydrogen, methyl, ethyl or phenyl and $R^3$ to $R^6$ are each independently hydrogen or methyl.

Imidazolinium ions (IVl) used are very particularly preferably those in which
$R^1$ and $R^2$ are each independently hydrogen, methyl, ethyl, 1-butyl or phenyl, $R^3$ and $R^4$ are each independently hydrogen, methyl or ethyl and $R^5$ and $R^6$ are each independently hydrogen or methyl.

Imidazolinium ions (IVm) or (IVm') used are very particularly preferably those in which $R^1$ and $R^2$ are each independently hydrogen, methyl or ethyl and $R^3$ to $R^6$ are each independently hydrogen or methyl.

Imidazolinium ions (IVn) or (IVn') used are very particularly preferably those in which
$R^1$ to $R^3$ are each independently hydrogen, methyl or ethyl and $R^4$ to $R^6$ are each independently hydrogen or methyl.

Thiazolium ions (IVo) or (IVo) and oxazolium ions (IVp) used are very particularly preferably those in which
$R^1$ is hydrogen, methyl, ethyl or phenyl and $R^2$ and $R^3$ are each independently hydrogen or methyl.

1,2,4-Triazolium ions (IVq), (IVq') or (IVq'') used are very particularly preferably those in which
$R^1$ and $R^2$ are each independently hydrogen, methyl, ethyl or phenyl and $R^3$ is hydrogen, methyl or phenyl.

1,2,3-Triazolium ions (IVr), (IVr') or (IVr'') used are very particularly preferably those in which
$R^1$ is hydrogen, methyl or ethyl and $R^2$ and $R^3$ are each independently hydrogen or methyl, or $R^2$ and $R^3$ together are 1,4-buta-1,3-dienylene.

Pyrrolidinium ions (IVs) used are very particularly preferably those in which
$R^1$ is hydrogen, methyl, ethyl or phenyl and $R^2$ to $R^9$ are each independently hydrogen or methyl.

Imidazolidinium ions (IVt) used are very particularly preferably those in which
$R^1$ and $R^4$ are each independently hydrogen, methyl, ethyl or phenyl and $R^2$ and $R^3$ and also $R^5$ to $R^6$ are each independently hydrogen or methyl.

Ammonium ions (IVu) used are very particularly preferably those in which
$R^1$ to $R^3$ are each independently $C_1$- to $C_{18}$-alkyl; or
$R^1$ and $R^2$ together are 1,5-pentylene or 3-oxa-1,5-pentylene and $R^3$ is $C_1$-$C_{18}$-alkyl or 2-cyanoethyl.

Very particularly preferred ammonium ions from the group (IVu) include methyltri(1-butyl)ammonium and tetra(1-butyl)ammonium; from the group (IVx1) N,N-dimethylpiperidinium and 1-butyl-1-methylpiperidinium; from the group (IVx2) 1-ethyl-3-methylimidazolinium; and from the group (IVx3) N,N-dimethylmorpholinium.

Examples of tertiary amines from which the quaternary ammonium ions of the general formula (IVu) are derived by quaternization with the stated radicals R are diethyl-n-butylamine, diethyl-tert-butylamine, diethyl-n-pentylamine, diethylhexylamine, diethyloctylamine, diethyl(2-ethylhexyl)amine, di-n-propylbutylamine, di-n-propyl-n-pentylamine, di-n-propylhexylamine, di-n-propyloctylamine, di-n-propyl(2-ethylhexyl)amine, diisopropylethylamine, diisopropyl-n-propylamine, diisopropylbutylamine, diisopropylpentylamine, diisopropylhexylamine, diisopropyloctylamine, diisopropyl(2-ethylhexyl)amine, di-n-butylethylamine, di-n-butyl-n-propylamine, di-n-butyl-n-pentylamine, di-n-butylhexylamine, di-n-butyloctylamine, di-n-butyl(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamine, N,N-di-n-butylcyclohexylamine, N-n-propylpiperidine, N-isopropylpiperidine, N-n-butylpiperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propylbenzylamine, di-n-butylbenzylamine, diethylphenylamine, di-n-propylphenylamine and di-n-butylphenylamine.

Preferred quaternary ammonium salts of the general formula (IVu) are those that can be derived from the following tertiary amines by quaternization with the stated radicals R, such as diisopropylethylamine, diethyl-tert-butylamine, diisopropylbutylamine, di-n-butyl-n-pentylamine, N,N-di-n-butylcyclohexylamine and also tertiary amines derived from pentyl isomers.

Particularly preferred tertiary amines are di-n-butyl-n-pentylamine and tertiary amines derived from pentyl isomers. A further preferred tertiary amine which has three identical radicals is triallylamine.

Guanidinium ions (IVv) used are very particularly preferably those in which
the nitrogen atoms are present in ring structures; or
$R^1$ to $R^5$ are methyl.

A very particularly preferred guanidinium ion (IVv) is N,N,N',N',N'',N''-hexamethylguanidinium.

Cholinium ions (IVw) used are very particularly preferably those in which
$R^1$ and $R^2$ are each independently methyl, ethyl, 1-butyl or 1-octyl and $R^3$ is methyl or ethyl;
$R^1$ is methyl, ethyl, 1-butyl or 1-octyl, $R^2$ is a —$CH_2$—$CH_2$—$OR^4$ group and $R^3$ and $R^4$ are each independently methyl or ethyl; or
$R^1$ is a —$CH_2$—$CH_2$—$OR^4$ group, $R^2$ is a —$CH_2$—$CH_2$—$OR^5$ group and $R^3$ to $R^5$ are each independently methyl or ethyl.

Particularly preferred cholinium ions (IVw) are those in which $R^3$ is selected from methyl, ethyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

Amidinium ions (IVx) used are very particularly preferably those in which the nitrogen atoms are present in a ring structure.

Very particularly preferred amidinium ions (IVx) include a monoprotonated form of 1,8-diazabicyclo[5.4.0]undec-7-ene (DBU) or of 1,5-diazabicyclo[4.3.0]non-5-ene.

Phosphonium ions (IVy) used are very particularly preferably those in which
$R^1$ to $R^3$ are each independently $C_1$-$C_{18}$-alkyl, especially butyl, isobutyl, 1-hexyl or 1-octyl.

Among the abovementioned heterocyclic cations, preference is given to the pyridinium ions, pyrazolinium ions, pyrazolium ions and the imidazolinium and imidazolium ions. Ammonium ions are also preferred.

Especially preferred are 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2-methyl-3-ethylpyridinium, 1-(1-tetradecyl)-2-methyl-3-ethylpyridinium, 1-(1-hexadecyl)-2-methyl-3-ethylpyridinium, 1-methylimidazolium, 1-ethylimidazolium, 1-(1-butyl)-imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium and 1-(prop-1-en-3-yl)-3-methylimidazolium.

Usable anions are in principle all anions.

The anion $[Y]^{n-}$ of the ionic liquid is preferably selected from
- the group of the halides
- the group of the carboxylic acids of the general formula:

    RCOO$^{1-}$

- the group of the carbonates and carbonic esters of the general formulae:

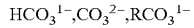
    HCO$_3^{1-}$, CO$_3^{2-}$, RCO$_3^{1-}$

- the group of the polybasic carboxylic acids of the general formula:

    R(COOH)$_n$(COO$^-$)$_m$ ($n \geq 0$, $m \geq 0$)

- the group of the aromatic hydroxyl compounds of the general formula:

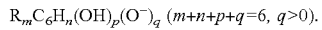
    R$_m$C$_6$H$_n$(OH)$_p$(O$^-$)$_q$ ($m+n+p+q=6$, $q>0$).

Therein, R means $C_1$-$C_{30}$-alkyl, $C_2$-$C_{18}$-alkyl optionally interrupted by one or more non-adjacent oxygen and/or sulfur atoms and/or one or more substituted imino groups, $C_6$-$C_{14}$-aryl, $C_5$-$C_{12}$-cycloalkyl or a five- to six-membered heterocycle which has oxygen, nitrogen and/or sulfur atoms, where two of them together may form an unsaturated, saturated or aromatic ring optionally interrupted by one or more oxygen and/or sulfur atoms and/or one or more unsubstituted or substituted imino groups, where the stated radicals may each additionally be substituted by suitable functional groups, aryl, alkyl, aryloxy, alkyloxy, halogen, heteroatoms and/or heterocycles.

Therein, $C_1$-$C_{18}$-alkyl optionally substituted by suitable functional groups, aryl, alkyl, aryloxy, alkyloxy, halogen, heteroatoms and/or heterocycles is by way of example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecythioethyl, 2-phenylthioethyl, 2,2,2-trifluoroethyl, 2-dimethylaminoethyl, 2-dimethylaminopropyl, 3-dimethylaminopropyl, 4-dimethylaminobutyl, 6-dimethylaminohexyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-alkyl optionally interrupted by one or more non-adjacent oxygen and/or sulfur atoms and/or one or more substituted or unsubstituted imino groups is by way of example 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

The number of non-adjacent oxygen and/or sulfur atoms and/or imino groups is not restricted in principle or is restricted automatically by the size of the radical or the ring building block. Generally, it amounts to not more than 5 in the respective radical, preferably not more than 4 or very particularly preferably not more than 3. There is moreover generally at least one, preferably at least two, carbon atom(s) between two heteroatoms.

Substituted and unsubstituted imino groups may be, for example, imino, methylimino, isopropylimino, n-butylimino or tert-butylimino.

The term "functional groups" is to be understood by way of example to mean the following: di(C$_1$-C$_4$-alkyl)amino, $C_1$-$C_4$-alkyloxycarbonyl, cyano or $C_1$-$C_4$-alkoxy. Here, $C_1$ to $C_4$-alkyl is methyl, ethyl, propyl, isopropyl, n-butyl, sec-butyl or tert-butyl.

$C_6$-$C_{14}$-aryl optionally substituted by suitable functional groups, aryl, alkyl, aryloxy, alkyloxy, halogen, heteroatoms and/or heterocycles is by way of example phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-cycloalkyl optionally substituted by suitable functional groups, aryl, alkyl, aryloxy, halogen, heteroatoms and/or heterocycles is by way of example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl and also a saturated or unsaturated bicyclic system such as norbornyl or norbornenyl.

A five- to six-membered heterocycle which has oxygen, nitrogen and/or sulfur atoms is by way of example furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

Particularly preferred anions in the ionic liquids are the halides, further preferably chloride, bromide and iodide, and very particularly preferably chloride.

The catalyst is preferably selected from the group of 1-ethyl-3-methylimidazolium bromide (EMIM-Br), 1-ethyl-3-methylimidazolium chloride (EMIM-Cl), 1-ethyl-3-methylimidazolium dicyandiamide (EMIM-DICY), 1-ethyl-3-methylimidazolium iodide (EMIM-I), 1-ethyl-2,3-methylimidazolium bromide (EDMIM-Br), 1-ethyl-3-methylimidazolium diethylphosphate (EMIM-DEP), 1-benzyl-3-methylimidazolium chloride (BEMIM-Cl), 1-butyl-1-methylpiperidinium chloride (BMPM-Cl), 1-(2-hydroxyethyl)-3-methylimidazolium chloride (HEMIM-Cl).

The catalyst is particularly preferably selected from the group of 1-ethyl-3-methylimidazolium bromide (EMIM-Br), 1-benzyl-3-methylimidazolium chloride (BEMIM-Cl), 1-butyl-1-methylpiperidinium chloride (BMPM-Cl), 1-butyl-3-methylpiperidinium chloride (BMPM-Cl), 1-(2-hydroxyethyl)-3-methylimidazolium chloride (HEMIM-Cl). In one further preferred embodiment, at least two of these catalysts are used.

In one further preferred embodiment, the ionic liquid is a combination of a Lewis acid and a Lewis base, where these are preferably selected from one of the abovementioned preferences.

Co-Catalysts:

In other preferred embodiments, in addition to the abovementioned catalyst, urea derivatives are employed as co-catalyst.

The use of ureas as co-catalysts aids the reaction of the isocyanate with the epoxide. A more rapid reaction of the isocyanate is advantageous as longer residence times of the isocyanate in the reaction mixture increase the likelihood of trimerization of the isocyanate and thus impair chemoselectivity for oxazolidone formation. Preference is given to ureas which do not eliminate any primary amines on decomposition, for example on supply of heat.

Suitable co-catalysts are accordingly urea derivatives of the following formula

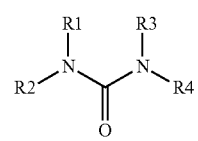

where

R1, R2, R3 and R4 are alkyl radicals each independently having 1 to 10 carbon atoms or R1 and R2 are alkyl radicals each independently having 1 to 10 carbon atoms and R3 is an aryl radical and R4 is simultaneously a hydrogen atom or R3 is an aryl radical and R4 is a hydrogen atom.

In one preferred embodiment, the aryl radical is substituted, preferably by another urea radical. In other preferred embodiments, the aryl radical is substituted by a plurality of urea radicals. The corresponding structures are also referred to as polyurea.

In other preferred embodiments, the alkyl substituents are connected to one another and include ring structures. Preferred examples of these are 1,3-dimethyl-3,4,5,6-tetrahydro-2(1H)-pyrimidinone and 1,3-dimethyl-2-imidazolidinone.

Particular preference is given to co-catalysts selected from the group of 3,3'-(4-methyl-1,3-phenylene)bis(1,1-dimethylurea) and 1,1-dimethyl-3-phenylurea. Commercially available products in this category are for example the dimethylureas from AlzChem with the trade name Dyhard.

Polymer Production:

The diepoxide, the diisocyanate and the catalyst are employed in accordance with the enumeration and preferences specified above.

In a first step, the epoxide and the catalyst are dissolved in a solvent and heated to reaction temperature. The reaction temperature is preferably in a range from 140° C. to 220° C., more preferably at 150° C. to 200° C. and particularly preferably at 160° C. to 180° C.

The solution is inertized with nitrogen; oxygen must be excluded in the reaction. The isocyanate is then slowly metered in while maintaining the reaction temperature.

The content of free isocyanate in the reaction mixture should be kept as low as possible in order to prevent trimerization of the isocyanate. This is controlled either by the rate at which the isocyanate is metered in and/or the reactivity, that is to say the amount of catalyst added.

In one preferred embodiment, the water content of the reaction mixture is less than 0.1% by weight. The side reaction of the isocyanate to give urea is thus prevented in particular. The molar ratio of the diepoxide to the diisocyanate is in a range from 1.0:0.5 to 0.5:1.0, preferably from 1.0:0.9 to 0.9:1.0 and particularly preferably is 1.0:1.0. The catalyst concentration is 0.05 mol % to 5 mol %, based on epoxide groups, preferably 0.05 mol % to 2 mol % and particularly preferably 0.05 mol % to 0.5 mol %. The concentration of the co-catalyst is 0.01 mol % to 1000 mol %, based on epoxide groups of the diepoxide, preferably 0.05 mol % to 100 mol %, particularly preferably 0.05 mol % to 10 mol % and especially 0.05 mol % to 1 mol %.

In one preferred embodiment, the co-catalyst is employed as a solvent for the reaction, wherein in a preferred embodiment the co-catalyst is 1,3-dimethyl-2-imidazolidone. The solvents are preferably dried before being used. In one preferred embodiment, they are dried by a molecular sieve.

Suitable solvents are aprotic and polar, in order not to react with the isocyanate, preferably dichlorobenzene, preferably 1,2-dichlorobenzene, 1,2,3-, 1,2,4- and 1,3,5-trichlorobenzene, sulfolane, mesitylene or N-methylpyrrolidone. A particularly preferred solvent is sulfolane (tetrahydrothiophene 1,1-dioxide).

In another preferred embodiment, the catalyst is charged, in a further preferably together with the co-catalyst, in solvent A and then heated to reaction temperature. The solvent comprising the catalyst, in the preferred embodiment the catalyst and co-catalyst, is also referred to as mixture A. Mixture A is freed of oxygen, that is to say is inertized, since oxygen has an adverse effect on the reaction. In one preferred embodiment, nitrogen is used for this inertization. In that case, the isocyanate is mixed homogeneously with the diepoxide in a solvent B, which is also referred to as mixture B, and, while maintaining the reaction temperature, is slowly metered into mixture A, comprising the catalyst, preferably the catalyst and the co-catalyst. The mixture of mixture A and mixture B is the reaction mixture. In another preferred embodiment, the co-catalyst is present in mixture B.

In a further preferred embodiment, the epoxide and the catalyst are initially charged, then heated to reaction temperature, and then the isocyanate is added. The isocyanate is added continuously or discontinuously, that is to say a little at a time. In this process, preferably little solvent, if any, is used. The melt viscosities can become very high as a result, and for that reason particularly suitable stirrer systems have to be used. Preferred examples of such stirrer systems are extruders or Plasti-Corders, such as those supplied by Brabender, for example.

In the processes mentioned, it is important to keep the content of free isocyanate in the reaction mixture as low as possible in order to inhibit trimerization of the isocyanate. This is controlled by at least one of the following features: the rate at which mixture B is metered in, the reactivity of the catalyst, the reactivity of the co-catalyst, the amount of catalyst added, the amount of co-catalyst and/or the reaction temperature.

The processes mentioned are preferably conducted with the exclusion of oxygen, since this has a disadvantageous effect on the reaction.

The reaction temperature of the processes is preferably in a range from 140° C. to 220° C., more preferably at 150° C. to 200° C. and particularly preferably at 160° C. to 180° C.

Use

The present invention also relates to the use of a polymer according to the invention for the production of applications selected from coatings, insulation elements, bellows, films, fibers, shaped articles, floors for buildings and transport, non-woven fabrics, preferably seals, rollers, shoe soles, hoses, cables, plug connectors, cable plugs, plug parts, cable sheathing, cushions, laminates, profiles, belts, saddles, foams, by additionally foaming the preparation, plug connections, tow cables, solar modules, automobile trim, cable harness components, interconnect devices, interconnect device components, three-dimensionally injection-molded interconnect devices, electrical connection elements, mechatronic components, modifiers for thermoplastic materials, that is to say substances which influence the properties of another material. Each of these uses taken alone is a preferred embodiment, which is also referred to as application. For this, the polymer is preferably provided in a first step in the form of granules or powder. The applications are produced therefrom preferably by injection molding, calendering, powder sintering or extrusion.

The moldings or semi-finished products that can be produced according to the invention from the thermoplastic molding compositions can for example be used in the motor vehicle industry, electrical industry, electronics industry, telecommunications industry, information technology industry, entertainment industry and computer industry, in vehicles and other means of locomotion, in ships, in spacecraft, in domestic scenarios, in office fitouts, sport, medicine and also generally in articles and parts of buildings that require increased fire protection.

The following examples show, by way of example, the advantageous property of the catalysts and use thereof in a polymer according to the invention. The examples are in no way limiting in respect of the concept of the invention.

EXAMPLES

Feedstocks:
o-Cresyl glycidyl ether (CAS no. 2210-79-9), Sigma-Aldrich
Naphthyl isocyanate (CAS no. 86-84-0), Sigma-Aldrich
Bisphenol A diglycidyl ether (CAS no. 1675-54-3), Sigma-Aldrich D 3415-250 g
Tolylene 2,4-diisocyanate (2,4-TDI) (CAS no. 584-84-9), Sigma-Aldrich
N,N''-(4-Methyl-m-phenylene)bis[N',N'-dimethylurea] (DYHARD® UR500). (CAS no. 17526-94-2), Alz Chem Catalysts:
1-Ethyl-3-methylimidazolium chloride (EMIM-Cl, CAS no. 65039-09-0, Basionics St 80, BASF)
1-Ethyl-3-methylimidazolium dicyandiamide (EMIM-DICY, CAS no. 370865-89-7, Basionics VS 03, BASF)
1-Ethyl-3-methylimidazolium ethylsulfate (EMIM-EtOSO$_3$, CAS no. 342843-75-5, Basionics LQ 01, BASF)
1-Ethyl-3-methylimidazolium bromide (EMIM-Br, CAS no. 65039-08-9, Iolitec)
1-Ethyl-3-methylimidazolium tosylate (EMIM-TOS, CAS no. 328090-25-1, Iolitec)
1-Ethyl-3-methylimidazolium diethylphosphate (EMIM-DEP, CAS no. 848641-69-0, Iolitec)
1-Benzyl-3-methylimidazolium chloride (BEMIM-Cl, CAS no. 36443-38-8, Iolitec)
1-Butyl-1-methylpiperidinium chloride (BMPM-Cl, CAS no. 845790-13-8, Iolitec)
1-Butyl-3-methylimidazolium chloride (BMIM-Cl, CAS no. 79917-90-1, Iolitec)
1-(2-Hydroxyethyl)-3-methylimidazolium chloride (HEMIM-Cl, CAS no. 61755-34-8, Iolitec)

Co-Catalysts:
N,N''-(4-Methyl-m-phenylene)bis[N',N'-dimethylurea] (DYHARD® UR500) (CAS no. 17526-94-2), AlzChem Solvents:
Sulfolane (CAS no. 126-33-0, Merck, no 845056), dried over 4 Å molecular sieve (Roth, bead form)
N,N-Dimethylacetamide (DMAC) (CAS no. 127-19-5, Merck, no. 803235)
1,2-Dichlorobenzene (CAS no. 95-50-1, Sigma-Aldrich)
Acetic acid (CAS no. 64-19-7, Bemd Kraft, no. 16873.4000)

Model reactions (to determine the selectivity of the catalysts):

In a 50 ml three-neck flask inertized with dry nitrogen and having a temperature sensor, magnetic stirrer, condenser, septum and N2 purging via the condenser, 8.0 g (48.72 mmol) of o-cresyl glycidyl ether (CAS no. 2210-79-9, Sigma-Aldrich) were weighed in and admixed with 0.24 mmol (0.5 mol %) of catalyst. The mixture was heated by means of an oil bath to 160° C. while stirring; this completely dissolved the catalyst. Next, 4.12 g (24.36 mmol) of naphthyl isocyanate (CAS no. 86-84-0, Sigma-Aldrich) were added by means of a syringe pump/cannula via the septum within 5 minutes at a constant metering rate. Directly after addition, a sample of approximately 200-300 μl of the reaction liquid was taken via the septum by means of a syringe and an IR spectrum was recorded. At intervals of 0.5 h, 1 h and hourly thereafter, further samples were taken and analyzed by IR. After complete conversion of the isocyanate, identifiable by the decrease in the IR band at 2256 $cm^{-1}$, stirring was effected for a further hour at reaction temperature and then the flask contents were cooled while stirring to approximately 70° C. and dispensed into a specimen bottle. An epoxide titration (EEW) and GPC analysis were carried out (solvent DMAC, reference is a synthetically prepared trimer of naphthyl isocyanate).

TABLE 1

| Example no. | Test | Catalyst | IR *), $R_{Ox/Tr}$ | IR, min. NCO = 0 | GPC % oxazolidone | GPC % isocyanurate | EEW |
|---|---|---|---|---|---|---|---|
| 1 | 24 | EMIM-Cl | 0.80 | 0 | 100 | 0 | 1235 |
| 2 | 30 | EMIM-DICY | 0.79 | 0 | 100 | 0 | 1059 |
| 3 | 33 | EMIM-EtOSO$_3$ | 0.61 | 540 | 64 | 36 | 681 |
| 4 | 39 | EMIM-Br | 0.78 | 30 | 100 | 0 | 704 |
| 5 | 42 | EMIM-tos | 0.63 | 240 | 77 | 23 | 468 |
| 6 | 43 | EMIM-DEP | 0.83 | 0 | 100 | 0 | 905 |
| 7 | 51 | BEMIM-Cl | 0.80 | 0 | 100 | 0 | 721 |
| 8 | 53 | BMPM-Cl | 0.81 | 0 | 100 | 0 | 649 |
| 9 | 54 | BMIM-Cl | 0.79 | 0 | 100 | 0 | 970 |
| 10 | 50 | HEMIM-Cl | 0.79 | 30 | 100 | 0 | 927 |

IR $R_{Ox/Tr}$ is the ratio of oxazolidone to trimer (isocyanurate), determined by IR
EEW = epoxide equivalent weight is a measure of the side reaction of epoxy homopolymerization The table shows that the catalysts of examples 4, 7, 8, 9 and 10 lead to particularly good polymer properties. These are therefore preferred.

Example 11—Polymer Reaction

In a 100 ml three-neck round-bottom flask inertized with dry nitrogen and equipped with a magnetic stirrer, condenser, temperature sensor and septum, 10.0 g (28.6 mmol) of bisphenol A diglycidyl ether (CAS no. 1675-54-3, Sigma-Aldrich D 3415-250 g) and 20.9 mg (0.143 mmol) of 1-ethyl-3-methylimidazolium chloride (EMIM-Cl, Basionics St 80, BASF, CAS no. 65039-09-0) were weighed out and dissolved in 58.24 g of sulfolane. The solution was heated under N2 purging to 160° C. Within 60 min, 4.54 g (26.1 mmol) of 2,4-TDI (CAS no. 584-84-9, Sigma-Aldrich) were metered in continuously by means of a syringe pump/cannula while stirring. After complete addition, a sample of approximately 200-300 μl was taken by means of a syringe and analyzed by IR. Samples were taken at regular intervals and, after complete conversion of the isocyanate, identifiable by the decrease in the IR band at 2256 $cm^{-1}$, stirring was effected for a further hour at reaction temperature, and then the solution was cooled to approximately 50° C. and slowly added to 400 ml of an ethanol/water mixture (80/20 v/v) while stirring vigorously. This precipitated the polymer formed and it could be separated off by vacuum filtration. The polymer was purified 2× via a filter with 100 ml each time of ethanol, and then dried to constant mass in a Petri dish in a vacuum drying oven at approximately 50° C. A white, fine powder was obtained that gave a clear solution in DMAC and had the following indices:

Reactivity ($t_{NCO}$=0, min.): 300 min
Mn (GPC): 2591 g/mol
Tg (DSC): 178° C.
$R_{ox/trimer}$ (IR): 0.62
Melting range: 150-160° C. (Kofler)

Example 12—Polymer Reaction

In a 100 ml three-neck round-bottom flask inertized with dry nitrogen and equipped with a magnetic stirrer, condenser, temperature sensor and septum, 10.0 g (28.6 mmol) of bisphenol A diglycidyl ether (CAS no. 1675-54-3, Sigma-Aldrich D 3415-250 g), 27.3 mg (0.143 mmol) of 1-ethyl-3-methylimidazolium bromide (EMIM-Br, Iolitec, CAS no. 65039-08-9) and 7.5 mg (0.0284 mmol) of N,N"-(4-methyl-m-phenylene)bis[N',N'-dimethylurea] (DYHARD® UR500, AlzChem, CAS no. 17526-94-2) were weighed out and dissolved in 59.94 g of sulfolane. The solution was heated under N2 purging to 160° C. Within 60 min, 4.95 g (28.4 mmol) of 2,4-TDI (CAS no. 584-84-9, Sigma-Aldrich) were metered in continuously by means of a syringe pump/cannula while stirring. After complete addition, a sample was taken by means of a syringe and analyzed by IR. Samples were taken at regular intervals and, after complete conversion of the isocyanate, identifiable by the decrease in the IR band at 2256 $cm^{-1}$, stirring was effected for a further hour at reaction temperature, and then the solution was cooled to approximately 50° C. and slowly added to 400 ml of an ethanol/water mixture (80/20 v/v) while stirring vigorously. This precipitated the polymer formed and it could be separated off by vacuum filtration. The polymer was purified 2× with 100 ml each time of ethanol, and then dried to constant mass in a Petri dish in a vacuum drying oven at approximately 50° C. A white, fine powder was obtained gave a clear solution in DMAC and had the following indices:

Reactivity ($t_{NCO}$=0, min.): 90 min
Mn (GPC): 6344
Tg (DSC): 179° C.
$R_{ox/trimer}$ (IR): 0.69

Example 13—Polymer Reaction, Preferred Embodiment

In a 500 ml three-neck round-bottom flask inertized with dry nitrogen and equipped with a precision glass stirrer, condenser, temperature sensor, dropping funnel and septum, 135.9 g of sulfolane and also 0.1372 g (71.5 mmol) of 1-butyl-1-methylpiperidinium chloride (BMPM-Cl, CAS no. 845790-13-8) and 0.0378 g (14.3 mmol) of N,N''-(4-methyl-m-phenylene)bis[N',N'-dimethylurea] (DYHARD® UR500, AlzChem, CAS no. 17526-94-2) were weighed out and heated to 175° C.; this completely dissolved the catalysts. In a separate vessel, 50.0 g (0.1431 mol) of bisphenol A diglycidyl ether (CAS no. 1675-54-3) and 23.7 g (0.1359 mol) of 2,4-TDI (CAS no. 584-84-9) were mixed with 36.4 g of 1,2-dichlorobenzene, and the mixture was homogenized while stirring at RT. The mixture was transferred into the dropping funnel and metered into the catalyst solution at a constant metering rate over 90 min. After complete addition, a sample was taken by means of a syringe and analyzed by IR. A distinct peak for the oxazolidone band (1750 cm$^{-1}$) and no signal for free isocyanate (2256 cm$^{-1}$) were observed. The reaction solution was stirred for a further hour at reaction temperature, and then cooled to approximately 80° C. and slowly added to 1000 ml of an ethanol/water mixture (80/20 v/v) while stirring vigorously. This precipitated the polymer formed and it could be separated off by vacuum filtration. The polymer was washed 2× with 100 ml each time of ethanol and then dried to constant mass in a Petri dish in a vacuum drying oven at approximately 80° C. The powder obtained was then dissolved in 200 ml of dichloromethane and precipitated out again in 800 ml of ethanol. The polymer was removed by filtration and twice slurried with 100 ml each time of ethanol and filtered. The polymer powder thus obtained was then dried over 4 h at 160° C. in a vacuum drying oven. A white, fine powder was obtained that gave a clear solution in DMAC and had the following indices:

Reactivity ($t_{NCO}$=0, min.): after complete addition of the solution

Mn (GPC): 11 865

Tg (DSC): 179° C.

$R_{ox/trimer}$ (IR): 0.71

Example 14—Determination of the Chemoselectivity of the Catalyst (R)

The chemoselectivity of the catalysis in respect of the formation of oxazolidone is assessed by evaluating the IR signals for oxazolidone (1750 cm$^{-1}$) and isocyanurate (1705 cm$^{-1}$) in accordance with the following formula:

$$R(ox:trimer) = \text{peak } H \frac{Ox}{\text{peak } H \: Ox + \text{peak } H \: trimer}$$

Example 15—Determination of the Epoxide Number (% EpO)

An epoxide titration was conducted in order to characterize the content of oxirane groups ("epoxide groups") in compounds. The epoxide number (% EpO) obtained indicates how many grams of oxirane oxygen are present in 100 grams of a sample. Crystal violet is used as an indicator. Determination requires the absence of water, bases and amines.

Reagents:
(1) 0.1 N perchloric acid (Merck) in glacial acetic acid
(2) Tetraethylammonium bromide (Fluka) in the form of a solution of 100 g of tetraethylammonium bromide in 400 ml of glacial acetic acid
(3) Crystal violet (Merck); 0.2 g of crystal violet in 100 ml of acetic acid was used to prepare the indicator solution.

Procedure:

0.2 to 0.5 g of the sample comprising oxirane rings is initially charged in an Erlenmeyer flask. The sample is dissolved in 50 ml of anhydrous acetone. Then 10 ml of tetraethylammonium bromide solution (see above) and 3 drops of crystal violet solution (see above) are added. The mixture is titrated with a 0.1 N solution of perchloric acid in glacial acetic acid. The end point is reached as soon as the color changes from blue to green.

A blank test is carried out (this comprises no oxirane compound) prior to conducting the actual titration, in order to exclude measurement errors.

Evaluation:

The epoxide content % EpO is calculated as follows: % EpO=[(a−b)+0.160]/E a:=consumption in ml of 0.1 N perchloric acid in titration
b:=consumption in ml of 0.1 N perchloric acid in blank test
E:=initial sample weight in grams The epoxide equivalent weight (EEW) is calculated by the following formula:

EEW=1600/% EpO

The units of EEW are g/eq.

The reactivity is the period of time after which a sample no longer gives any visible signal of the isocyanate band (2256 cm$^{-1}$) in the IR.

The invention claimed is:

1. A thermoplastic polymer produced at least from diisocyanate and diepoxide using a catalyst, wherein the catalyst is an ionic liquid that comprises a salt of formula (I)

[A]$^+_n$[Y]$^{n-}$ wherein:
n is 1, 2, 3 or 4,
[A]$^+$ is a quaternary ammonium cation comprising at least one five- to six-membered heterocycle that has at least one nitrogen atom and optionally an oxygen or sulfur atom, wherein the nitrogen atom of the heterocycle is quaternized with $C_1$-$C_{18}$-alkyl; and
[Y]$^{n-}$ is a monovalent, divalent, trivalent or tetravalent anion.

2. The polymer according to claim 1, wherein the catalyst is selected from the group consisting of 1-ethyl-3-methylimidazolium bromide (EMIM-Br), 1-ethyl-3-methylimidazolium chloride (EMIM-Cl), 1-ethyl-3-methylimidazolium dicyandiamide (EMIM-DICY), 1-ethyl-3-methylimidazoliumiodide (EMIM-I), 1-ethyl-3-methylimidazolium diethylphosphate (EMIM-DEP), 1-benzyl-3-methylimidazolium chloride (BEMIM-Cl), 1-butyl-1-methylpiperidinium chloride (BMPMCl), and 1-(2-hydroxyethyl)-3-methylimidazolium chloride (HEMIM-Cl).

3. The polymer according to claim 1, wherein the catalyst is selected from the group consisting of 1-ethyl-3-methylimidazolium bromide (EMIM-Br), 1-benzyl-3-methylimidazolium chloride (BEMIMCl), 1-butyl-1-methylpiperidinium chloride (BMPM-Cl), and 1-(2-hydroxyethyl)-3-methylimidazolium chloride (HEMIM-Cl).

4. The polymer according to claim 1, wherein a co-catalyst is used in addition to the catalyst.

5. The polymer according to claim 1, wherein the diepoxide is selected from the group of a diepoxide based on diglycidyl ethers of bisphenol A, bisphenol F or a mixture of the two.

6. The polymer according to claim 1, wherein the diepoxide used is a mixture of diglycidyl ethers of bisphenol A or bisphenol F, or a mixture of the two, in combination with a diglycidyl ether based on cardanol.

7. The polymer according to claim 1, wherein the diisocyanate is an aromatic diisocyanate.

8. The polymer according to claim 1, wherein the diisocyanate is tolylene diisocyanate (TDI), naphthylene 1,5-diisocyanate (NDI) or diphenylmethane diisocyanate (MDI) or a mixture of at least two of these isocyanates.

9. A process for producing the polymer according claim 1, comprising:
    heating the diepoxide and the catalyst to a reaction temperature and
    metering in the diisocyanate.

10. A process for producing the polymer according to claim 1, comprising:
    dissolving the catalyst in a solvent, and heating the catalyst with the solvent to a reaction temperature, and
    metering in a mixture of the diisocyanate with the diepoxide.

11. The process according to claim 9, wherein the reaction is effected with the exclusion of oxygen.

12. The process according to claim 9, wherein the reaction temperature is in a range from 140° C. to 220° C.

13. The process according to claim 9, wherein the molar ratio of the diepoxide to the diisocyanate is in a range from 1.0:0.5 to 0.5:1.0.

14. The process according to claim 9, wherein the catalyst concentration is 0.05 mol % to 5.0 mol %, based on epoxide groups of the diepoxide.

15. The process according to claim 9, wherein a co-catalyst is present, and the concentration of the co-catalyst is 0.01 mol % to 1000 mol %, based on epoxide groups of the diepoxide.

16. The polymer according to claim 1, wherein said catalyst consists of said ionic liquid with an optional co-catalyst.

* * * * *